United States Patent [19]
Miller et al.

[11] Patent Number: 5,801,893
[45] Date of Patent: Sep. 1, 1998

[54] METHOD FOR ADAPTIVELY DETECTING TAPEWRAP IN CASSETTE TAPE PLAYER

[75] Inventors: Kenneth Christopher Miller, Canton; Max Cannon Chapman, Plymouth; Daniel Thomas Donaldson, Canton, all of Mich.

[73] Assignee: Ford Motor Company, Dearborn, Mich.

[21] Appl. No.: 673,549

[22] Filed: Jul. 1, 1996

[51] Int. Cl.$^6$ .................................................. G11B 15/48
[52] U.S. Cl. ...................... 360/74.2; 360/74.3; 360/74.1; 242/333.7
[58] Field of Search .................. 360/74.02, 72.03, 360/73.11, 74.01, 73.06, 73.05, 73.04; 242/333.7, 333.6, 333.5, 333.1

[56] References Cited

U.S. PATENT DOCUMENTS

| | | | |
|---|---|---|---|
| 4,597,547 | 7/1986 | Tarpley, Jr. et al. | 360/74.2 |
| 4,632,333 | 12/1986 | Tarpley, Jr. | 360/74.2 |
| 4,806,861 | 2/1989 | Urayama et al. | 360/74.2 |
| 5,018,040 | 5/1991 | Nishida | 360/74.2 |
| 5,107,380 | 4/1992 | Fujiki et al. | 360/75 |
| 5,209,422 | 5/1993 | Lee | 360/74.2 |
| 5,600,504 | 2/1997 | Seo | 360/74.2 |
| 5,617,336 | 4/1997 | Lee | 360/74.2 |
| 5,659,435 | 8/1997 | Han | 360/74.2 |

*Primary Examiner*—Nabil Hindi
*Attorney, Agent, or Firm*—Mark L. Mollon, Esq.; Roger L. May, Esq.

[57] ABSTRACT

A method for adaptively detecting when portion of a magnetic tape is wrapped around a capstan of a magnetic tape cassette player includes the steps of transferring the magnetic tape from a supply reel to a take-up reel for a first rotation of the take-up reel, passing the magnetic tape across the capstan when the magnetic tape is being transferred, measuring a first set of pulses of a signal during the first rotation of the take-up reel, measuring a subsequent set of pulses during each subsequent set of a take-up reel, and stopping the rotation of the take-up reel when the subsequent set of pulses varies from the subsequent of pulses immediately proceeding to prevent the magnetic tape from wrapping around the capstan.

6 Claims, 9 Drawing Sheets

METHOD FOR ADAPTIVELY DETECTING TAPEWRAP IN CASSETTE TAPE PLAYER

BACKGROUND OF THE INVENTION

1. Field of the Invention

The present invention relates to cassettes tape players with a system for preventing improper tape feed. More particularly, the present invention relates to a method for adaptively detecting when a magnetic tape from a cassette is wrapped around a capstan.

2. Description of the Related Art

Vehicle and home entertainment systems commonly use auto cassette tapes for recording and playback of music and other audio recordings. Cassette tape cartridges vary widely a quality of material and design. The best cassette tape cartridges are made from impact and heat resistant materials which are durable and provide thousands of hours a quality playback. However, many manufactures use inferior cassette tape cartridges due to their low costs. "Bargain" cassettes may not comply with minimum standards for cassette design, testing and manufacturing. If a cassette is not manufactured to precise tolerances, it will not maintain uniform rolling friction of internal parts and may result in improper tape guidance. In severe cases, this may result in tape spilling into the transport mechanism and wrapping around the capstan. A condition commonly referred to as "tape eating" occurs when tape spills from the cassette and wraps onto the capstan, pinch roller or other parts of the cassette player. "Tape eating" occurs relatively frequently at home and in vehicle cassette tape players.

Three principal factors are associated with tape eating: (i) the tape cassette take-up hub may not rotate freely; (ii) the tape may be loosely wound on the tape reels or separated from the tapepack; (iii) the cassette may have thin tape commonly used in long-playing 120 minute playback cassettes.

When take-up hub rotation is impaired, tape pulled by the capstan from the supply reel does not wind onto the take-up hub. Tape then spills into the tape transport mechanism and wraps onto the capstan or pinch roller. The cause of impaired take-up reel rotation is generally related to one of the following conditions and cassette cartridge defects: (i) the hub may be dislodged out of position and damaged as a result of the cassette being dropped; (ii) the cassette shell may be made from low grade plastic which warps upon exposure to high temperatures; (iii) improper sonic welding of a cassette may cause misalignment between the two shell halves which reduces internal dimensional tolerances; and (iv) inadequate internal support between the two half shells of the cassette may result in shell deformation when placed in a tape player.

Step formations in the tapepack may cause excessive friction, especially when repeated changes in play and fast forward or rewind modes occur in cassettes having poor internal tape guidance.

"Tape eating" caused by loose tape is more frequently encountered with vehicle cassette tape players then in home players due to the extreme conditions in which the tapes are used and stored. When the cassettes tapes are stored in the vehicle outside their protective case, vehicle vibrations can be transferred to the cassette and loosen the tape. Upon insertion, the tape may spill into the mechanism, at which time the tape can wrap onto the capstan.

"Tape eating" caused by use of thin tape can result from an initial formation of a small loop in the tape caused by the tape following the curvature of the capstan upon initial insertion. If a cassette tape cartridge does not have ramps or tape strippers required by the industry standard, a portion of the tape will be able to follow the capstan rotation, catch under the pinch roller, and subsequently wrap around the capstan.

It is estimated that a significant percentage of all cassettes system failures in vehicle warranty claims are in some related to defective or improperly stored cassette cartridges. Cassette system failures are costly to equipment manufactures, particularly during the warranty. When a consumer returns a vehicle to the dealer for repair, it is frequently necessary to entirely remove and disassemble the tape player from the vehicle for service leading to consumer dissatisfaction.

Several attempts have been made to prevent "tape eating" in the prior art. One example is disclosed in U.S. Pat. No. 4,348,702 to Taraborrelli which describes a device for preventing tape wind up on the capstan of a tape deck. The Taraborrelli device incorporates a rotation-sensing switch and switch wiper mounted on the bottom of the take-up spindle. The rotation sensing switch allows only rotation when the take-up spindle rotates in a proper direction. If the take-up spindle changes direction due to tape windup on the capstan, a tab on a rotation-sensing switch engages a vertical edge at the bottom of the take-up spindle and stops the sensor switch from rotating. When the rotation-sensing switch stops, the rotation-sensing circuit disables the drive mechanism to prevent additional tape wind-up on the capstan. However, the rotation sensing switch is not sensitive enough to detect the tape windup as soon as it happens and additional tape may windup during the time the switch moves to engage the vertical edge.

Another approach is disclosed in U.S. Pat. No. 4,597,547 to Tarpley et al. which describes a logic circuit for detecting reverse rotation of a take-up reel in a tape transport mechanism wherein three motion sensing switches are added to a tape player adjacent the take-up reel to detect a sequence of switch actuation according to the sequence of A-B-C. Subsequent switch activation sequences are then monitored by a logic circuit which can sense and react to an improper switching sequence. The switches and logic circuit are additional elements which must be added to a cassette tape player, thereby increases costs. Additionally, there is no way to adjust the sensitivity of the motion sensing switches to compensate for changes in the rotational velocity of the take-up reel, making early detection difficult.

In U.S. Pat. No. 4,632,333 to Tarpley, Jr., another circuit sensing improper rotation of a take-up reel is disclosed wherein three switches are provided on the cassette player adjacent to take-up reel. The sensing circuit outputs a pulse each time the sensor switches are activated. Monostable multivibrators receive the pulses and provide output signal into a gate which responds by providing a control signal to a sensor switch. Improper rotation of a take-up reel interrupts the control signal, causing the sensor switch to respond by stopping or reversing the tape deck mechanism. The need for switches in monostable multivibrators in a special sensing circuit again increase the cost of the cassette tape deck equip with such a system. The present invention is directed to overcome the above disadvantages noted injunction with prior art systems to provide a new system which surpasses the prior art in efficiency and simplicity.

SUMMARY OF THE INVENTION

The present invention is a method for adaptively detecting when a portion of a magnetic tape is wrapped around a capstan of a magnetic tape cassette player. The method includes the steps of transferring the magnetic tape from a supply reel to a take-up reel for a first rotation of the take-up reel. The method also includes the step of passing the magnetic tape across the capstan when the magnetic tape is being transferred. The method includes the step of measuring a first set of pulses of a signal during the first rotation of the take-up reel. The method includes the step of measuring subsequent set of pulses during each subsequent rotation of the take-up reel. The method also includes the step of stopping the rotation of the take-up reel when the subsequent of set of pulses varies from the subsequent of pulses immediately proceeding to prevent the magnetic tape from wrapping around the capstan.

One advantage associated with the present method is the ability to adaptively monitor the rotational speed of the take-up reel to identify immediately when the speed thereof changes resulting in the magnetic tape wrapping around the capstan. Another advantage associated with the present method is the use of existing hardware and microprocessor capability to reduce the cost of implementing a "tape eating" or aberrant operational condition system with little or no addition cost except for the cost of programming existing microprocessor capacity with the algorithm disclose. Another advantage associated with the present invention is the ability to provide a detection system which can adjust its defined range of normal operation adaptively from rotation to rotation to account for varying operating conditions in the tape player and to enable early detection of aberrant tape condition regardless of where on the tape the aberration occurs.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
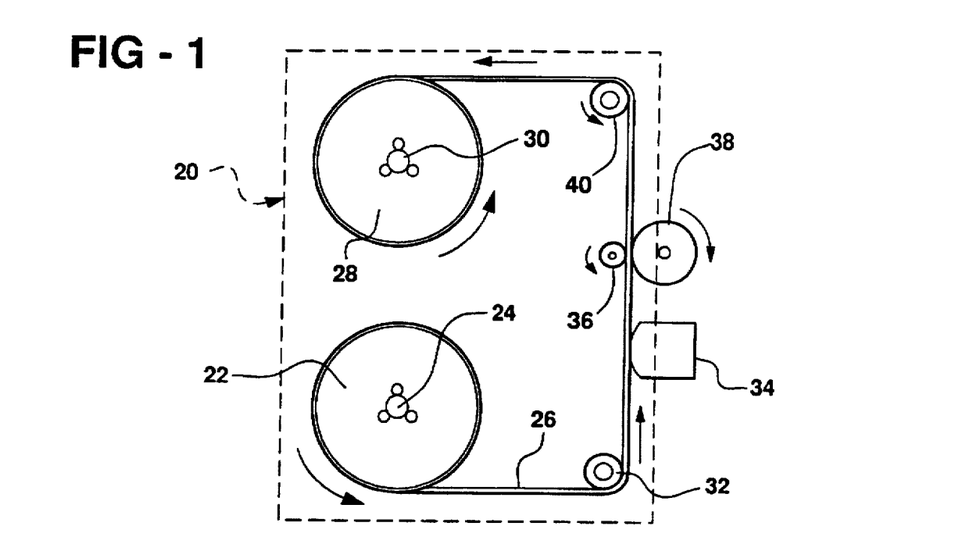
FIG. 1 is a plan view of a reel-to-reel cassette tape deck under normal operating conditions.

Referring to FIG. 1, a tape cassette is generally indicated at 20. The tape cassette 20 includes a supply reel 22 secured to a supply reel spindle 24. A magnetic tape 26 is transferred between the supply reel 22 and a take-up reel 28 which is secured to a take-up reel spindle 30. The tape 26 is guided by a feed alignment roller 32 past the playback head 34. A capstan 36 and pinch roller 38 move the tape 26 as a constant speed past the playback head 34. A take-up alignment roller 40 guides the tape 26 as it is fed from between the capstan and pinch roller 38 to the take-up reel 28.

Figure 2:
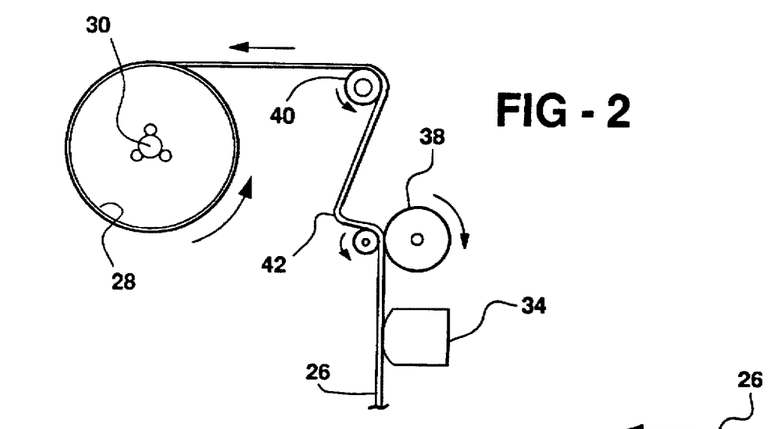
FIG. 2 is a plan view of a conventional reel-to-reel cassette tape deck developing a slack tape loop adjacent to the capstan.

FIG. 2 illustrates a common condition wherein a loop 42 forms between the capstan roller 36 and the take-up alignment roller 40. This occurs upon initial start-up of the tape deck 20 or if the take-up reel 28 stops rotating. The loop 42 forms as tape follows the curvature of the capstan roller 36. Normally, the loop 42 is automatically eliminated as the take-up reel 28 takes up the access tape 26.

Figure 3:
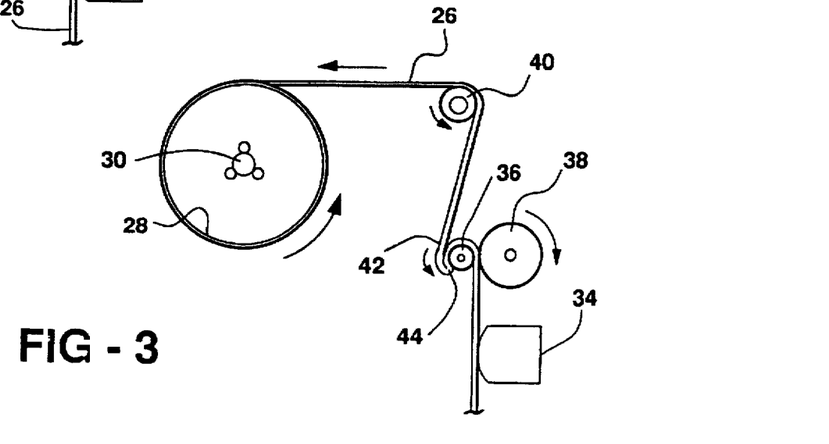
FIG. 3 is a plan view of a portion of a conventional cassette tape deck showing a slack loop wrapping around the capstan and being caught between the incoming tape and the capstan.

Referring to FIG. 3, an aberrant tape feed condition is illustrated wherein the loop 42 becomes caught around the capstan roller 36 and forms a roll 44 of tape which rapidly accumulates on the capstan roller 36. If the loop 42 becomes caught between the capstan roller 36 and the pinch roller 38, the rotational direction of the take-up reel 28 is reversed and tape feeds in the reversed direction from the take-up reel 28 as it winds about the capstan roller 36. Any delays in detecting the reverse rotation of the take-up reel 28 enable addition tape to wrap around the capstan roller 36 making the roll 44 larger and more likely to damage the tape deck. Ideally, the aberrant tape condition is detected as soon as the loop 42 catches between the capstan roller 36 and the pinch roller 38.

Figure 4:
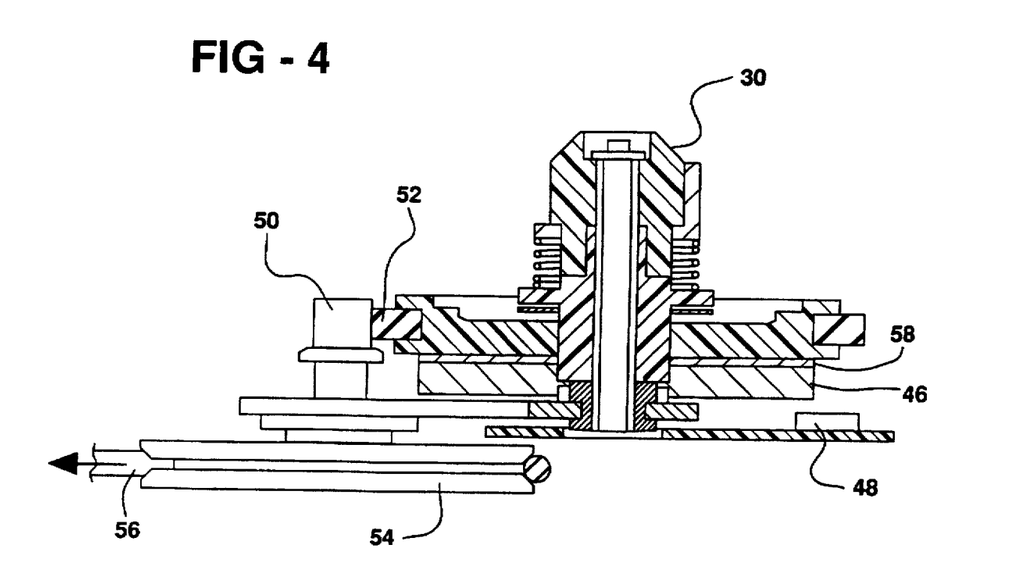
FIG. 4 is a cross-sectional view of a tape-up reel spindle.

Referring to FIG. 4, a take-up reel spindle 30 is shown in cross-section. A spindle drive 50 fractionally engages a rubber ring 52 which is secured to take-up reel spindle 30 to drive spindle. A drive pulley 54 forms part of the spindle drive 50 and is rotated by means of a drive belt 56. A multi-pole magnetized disk 46 is secured to the take-up reel 30 as shown in FIG. 4. A slip clutch 58 prevents excess tension from occurring on the tape. The sensor such as a reed switch 48 responds to changes in the magnetic field caused by the rotation of multi-pole magnetized disk 46. The multi-pole magnetized disk 46 and reed switch 48 currently exist in conventional tape decks for sensing end-of-tape and other spindle rotation conditions and are a part of an end-of-tape sensing mechanism.

Figure 5:
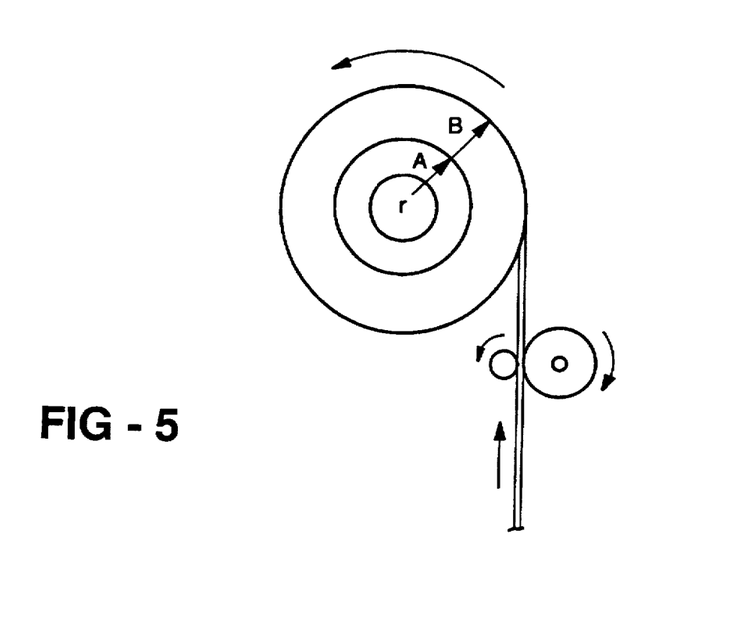
FIG. 5 is a diagrammatic view illustrating the effect in increasing the diameter of tape wound on the take-up reel spindle.

FIG. 5 diagrammatically illustrated variable utilized in the present method. The radius of the tape pack, designated small r, increases as tape winds onto the cassette cartridge wheel. As the radius increases, the rotational frequency of the take-up spindle decreases. The take-up reel rotates in a counterclockwise direction. The radius increases from a minimum radius of A for an empty take-up reel to a maximum radius of B for a full take-up reel. The rotational frequency of the take-up reel follows the following equation wherein:

$$F_r = \frac{V}{2\pi r}$$

wherein:
V=velocity;

r=radius;
A=minimum radius; and
B=maximum radius.

For example, the radius of a sixty minute cassette changes approximately 34 micrometers per revolution and consequently the rotational frequency changes approximately 0.002 revolutions per second. These changes are graphically represented by the diamonds 60 in FIG. 12 discussed in greater detail subsequently.

Figure 6:
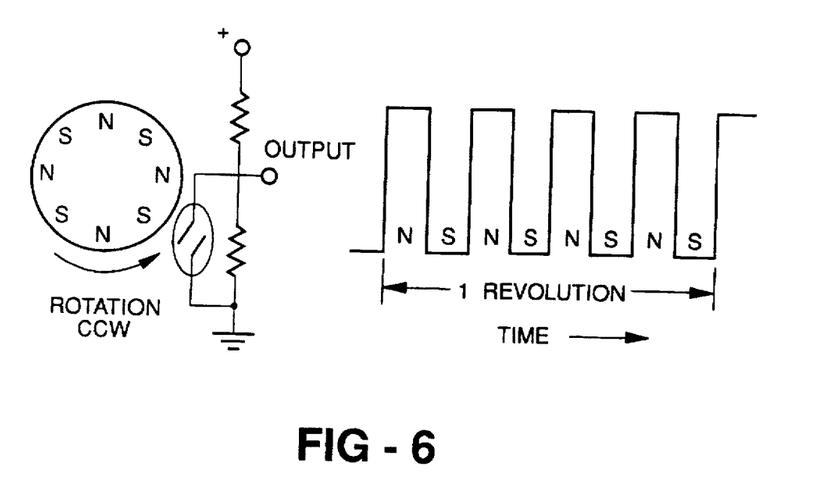
FIG. 6 is a diagrammatic view of the output of the circuit of the present invention when operating at radius A of FIG. 5.
Figure 7:
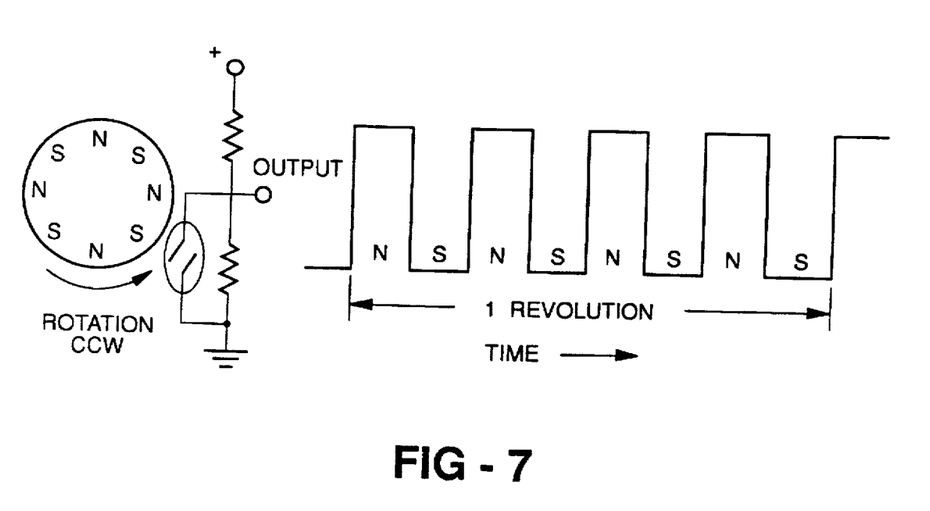
FIG. 7 is a diagrammatic view showing the output of the circuit of the present invention when operating at the radius B of FIG. 5.

FIGS. 6 and 7 illustrate the output of the take-up spindle sensor. FIG. 6 illustrates the take-up spindle sensor output for an empty tape-up reel. For comparison, FIG. 7 illustrates the take-up spindle sensor output for a full take-up reel. The pulse width of the output signal is inversely proportional to the rotational frequency of the take-up reel. The rotational frequency is related to the tape pack as stated above, and consequently, the pulse width of the output signal increases as the radius of the tape pack increases and the rotational frequency decreases. Similarly the pulse width of the output signal decreases as the rotational frequency of the take-up reel increases.

Figure 12:
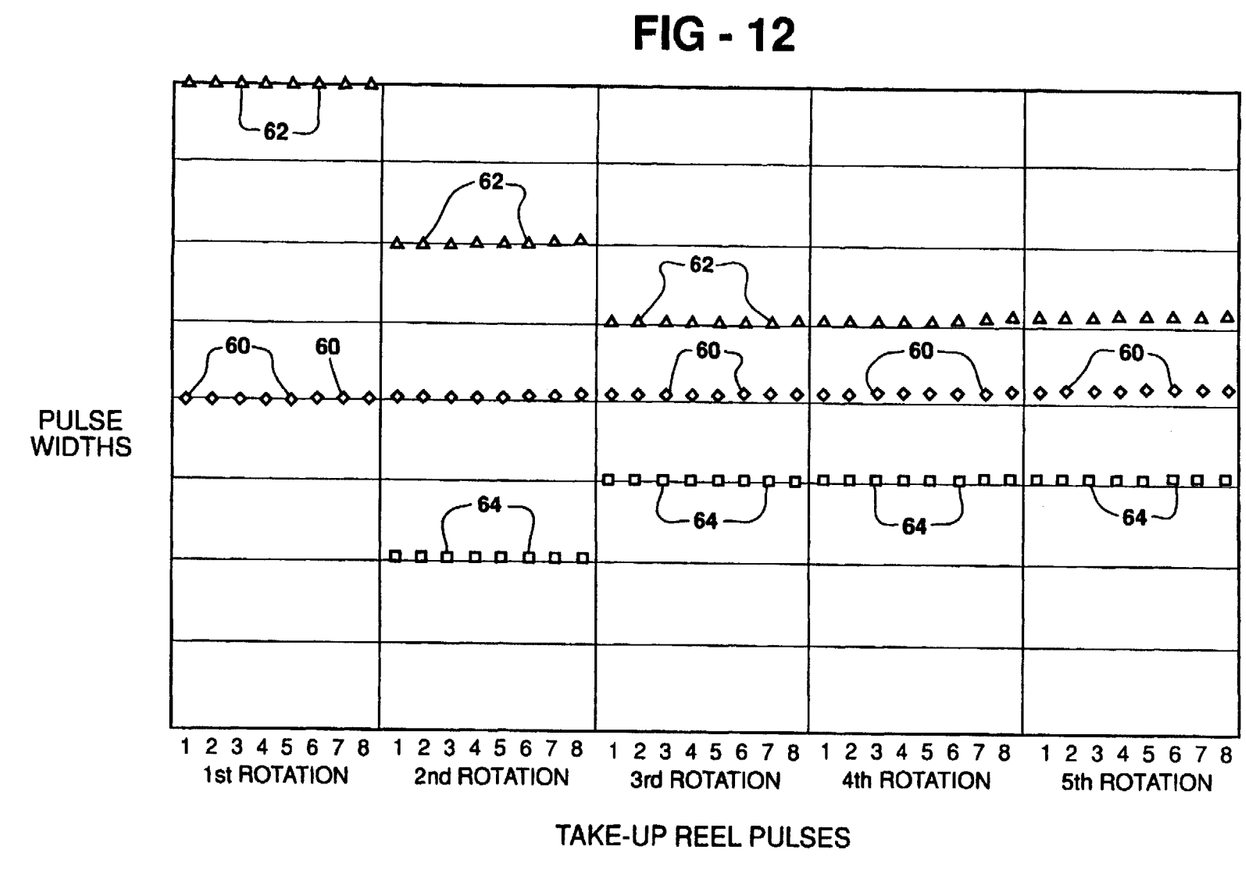
FIG. 12 is a graphic representation of the adaptively changing limits associated with each rotation.

Referring to FIG. 12, it may be seen that for every rotation of the take-up reel, eight pulse will be generated and are designated by a diamond 60. FIG. 12 represents a cassette tape having a concentric take-up reel wherein the pulse widths associated with each pulse of each rotation is slightly larger than its respective pulse in the preceding rotation of the take-up reel 28. More specifically, the pulse in a particular position within a rotation is slightly larger than the pulse in the same position in the preceding rotation because the take-up reel 28 is collecting more tape and slowing down gradually. The upper limits 62, represented by triangles, and the lower limits 64, represented by squares, will be discussed in greater detail subsequently.

Figure 8:
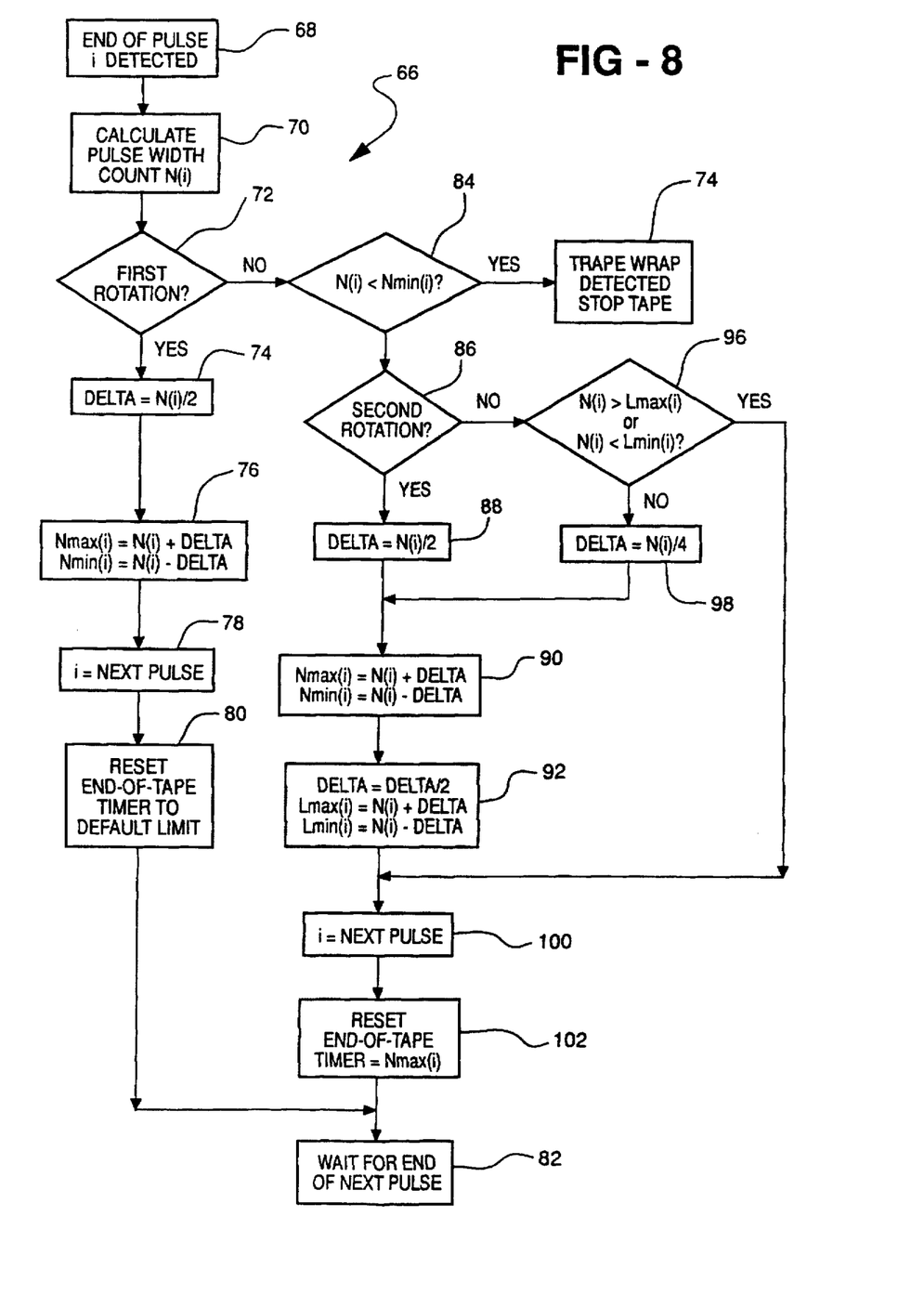
FIG. 8 is a flow chart illustrating the steps of one embodiment of the present invention.

Referring to FIG. 8, one embodiment of the method for adaptively detecting when a portion of a magnetic tape is wrapped around a capstan 36 of the magnetic tape cassette player 20 it is generally indicated at 66. The method begins with beginning the tape 26 to transfer from the supply reel 22 to the take-up reel 28. From the sensors shown in FIG. 6 and 7, the first rotation of the take-up reel is identified at 72. A first set of pulses of a signal are measured during the first rotation of the take-up reel. There are eight measurements for each rotation. These pulses are transformed into pulse widths and are identified as 60 in FIG. 12. When the end of a pulse is detected at 68, the pulse width at that particular count N(i) is calculated at 70 and represented by the pulse widths 60 in FIG. 12.

A subsequent set of pulses for the subsequent rotation immediately following is detected wherein the pulse width thereof is calculated for each pulse generated in each subsequent rotation of the take-up reel 28. The rotation of the take-up reel 28 is stopped at 74 when a subsequent pulse varies from the subsequent pulse immediately proceeding to prevent the magnetic tape from wrapping around the capstan 36. More specifically, if the set pulses N(i+1) are substantially greater than the pulses N(i), the take-up reel 28 is stopped at 74. To determine when the take-up reel 28 should stop, the method includes the step of establishing stopping limits, Nmax(i) and Nmin(i), for each pulse in each of the subsequent sets of pulses based on each respective pulse from the subsequent set immediately proceeding the set of pulses being measured. The step of stopping the take-up reel 28 occurs when any of the pulses in the subsequent set exceed one of the stopping limits defined for that set.

Returning attention to the flow chart shown in FIG. 8, the stopping limits are defined by calculating DELTA which is the calculated pulse width for the current pulse width divided by two. DELTA is then added to the calculated pulse width to define the upper stopping limit Nmax(i). Likewise, the lower stopping limit is defined as the calculated pulse width minus DELTA, Nmin(i). This is performed at 76. The method is then iterated to the next pulse at 78. The end-of-timer is then reset to the default limit at 80 after which the weight for the end of the next pulse occurs at 82 so that the pulse width for the subsequent pulse may be calculated at 70. The stopping limits, both upper and lower, are fifty percent of the pulse width during the first rotation of the take-up reel 28. This rather large limit allows for loose tape during the start of the playback of the magnetic tape 26.

Because such a limit is not always needed, the stopping limits are reduced by fifty percent during the second rotation. Therefore, DELTA becomes one quarter of the pulse width. This will be discussed in greater detail subsequently.

If it is determined that the rotation of the take-up reel 28 is not the first rotation, it determined whether the pulse width is less than the lower stopping limit at 84. If so, tape wrap has been detected and the take-up reel 28 is stopped whereafter the tape is ejected from the cassette player. A graphic representation of this is shown in FIG. 10. Although the upper limit may be tested in a similar method, the upper limit is not tested in the methods shown in FIG. 8. The upper limit is tested by the end-of-tape sensor which is equipped with a timer. The use of the timer in the end-of-tape sensor provides a quicker detection of a long pulse which is characteristics of a tape wrap condition as shown in FIG. 9.

If the pulse width for the pulse at time i is neither greater than the upper limit nor less than the lower limit, it is determined at 86 if the current rotation is the second rotation of the tape-up reel 28. If so, DELTA is again divided by two at 88. The upper and lower stopping limits are again calculated at 90. DELTA is then divided by two to create a new DELTA at 92. Upper and lower inhibiting limits, best seen in FIG. 11 as the rectangles Lmax(2) and Lmin(2) 94. The inhibiting limits are used as a second test. The inhibiting limits are established in each of the subsequent sets, namely all rotations but the first rotation, based on each respective pulse from the subsequent set immediately proceeding. More specifically, the inhibiting limits Lmax(i) and Lmin(i) at rotation x are calculated from Lmax(i) and Lmin(i), respectively, at rotation (x−1). The step of establishing and redefining stopping limits is inhibited when any of the pulses in the subsequent set exceed one of the inhibiting limits therefor. More specifically, in any subsequent rotation after the second rotation, the pulse widths are tested against the inhibiting limits at 96. If the pulse or, more specifically, the calculated pulse width, is greater than the upper inhibiting limit Lmax(i) or if the current is less than the lower inhibiting limit Lmin(i), the stopping limits associated with that position of the current pulse in the subsequent set of pulses in the subsequent rotation will not be modified because the pulse width is approaching the stopping limits. If the pulse width is within the inhibiting limits, DELTA is divided by four at 98 and the stopping limits and the inhibiting limits are recalculated at 90 and 92, respectively. Once the limits have been recalculated, the next pulse is viewed at 100 and the end-of-tape timer is reset to the upper stopping limit at 102.

Referring to FIG. 10, a pulse width in the third position of the fifth rotation is less than the minimum stopping limit calculated by the pulse width in the third position of the fourth rotation. Because the pulse width is less than the minimum stopping limit, the take-up reel 28 is stopped preventing additional tape 26 from winding around the capstan 36.

Figure 9:
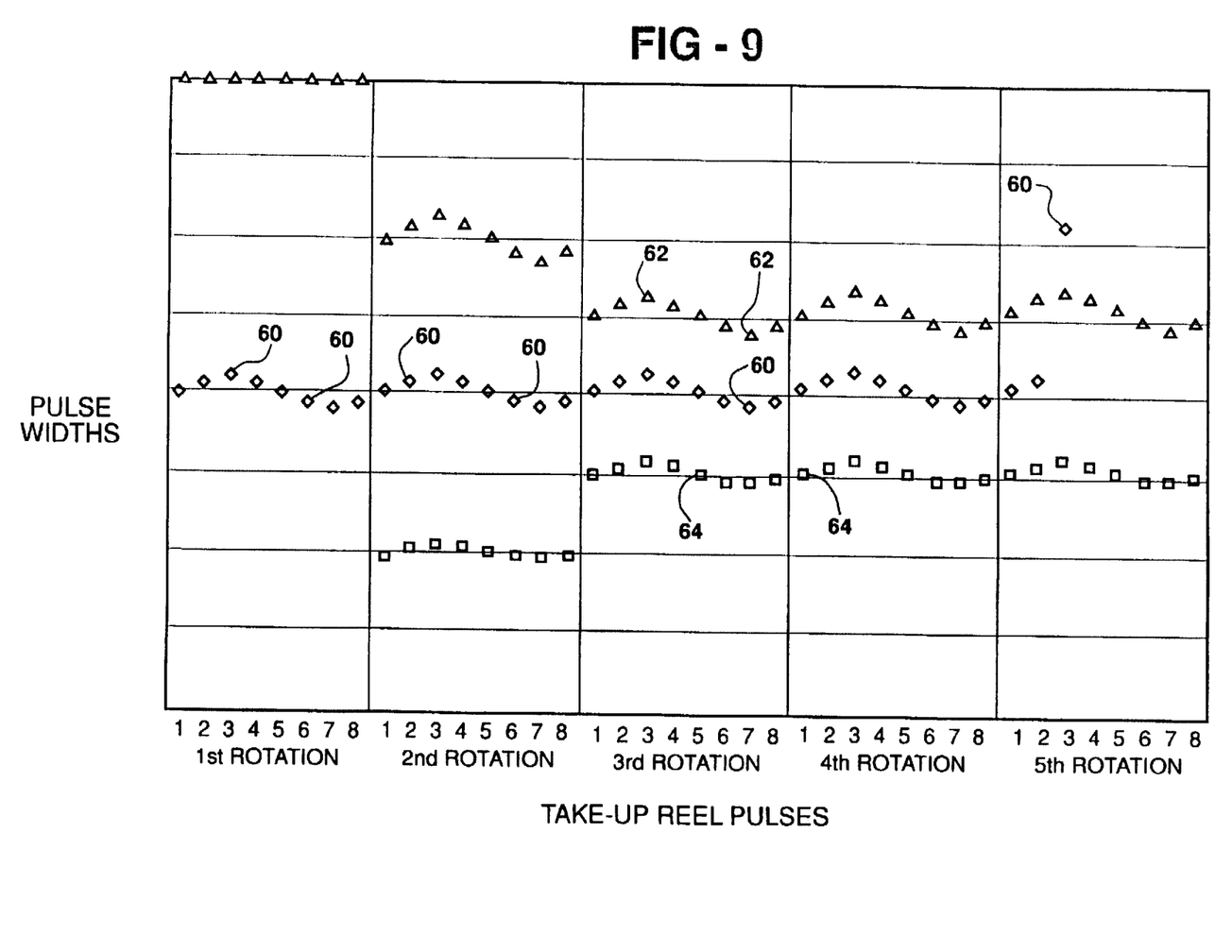
FIG. 9 is a graphic representation of pulses of a tape having a non-concentric rotational motion.
Figure 10:
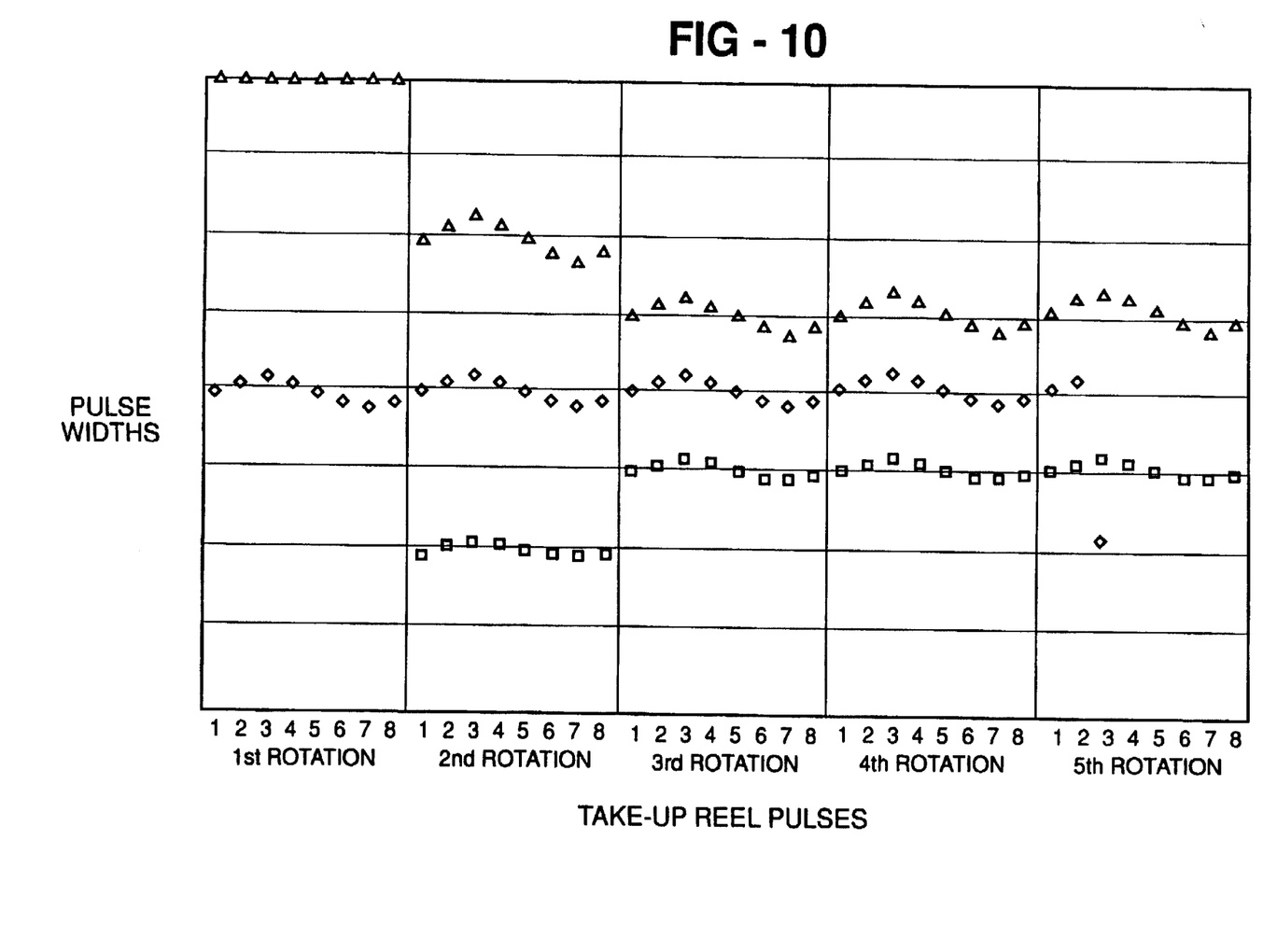
FIG. 10 is a graphic representation of pulses of a magnetic tape having a non-concentric rotational motion.
Figure 11:
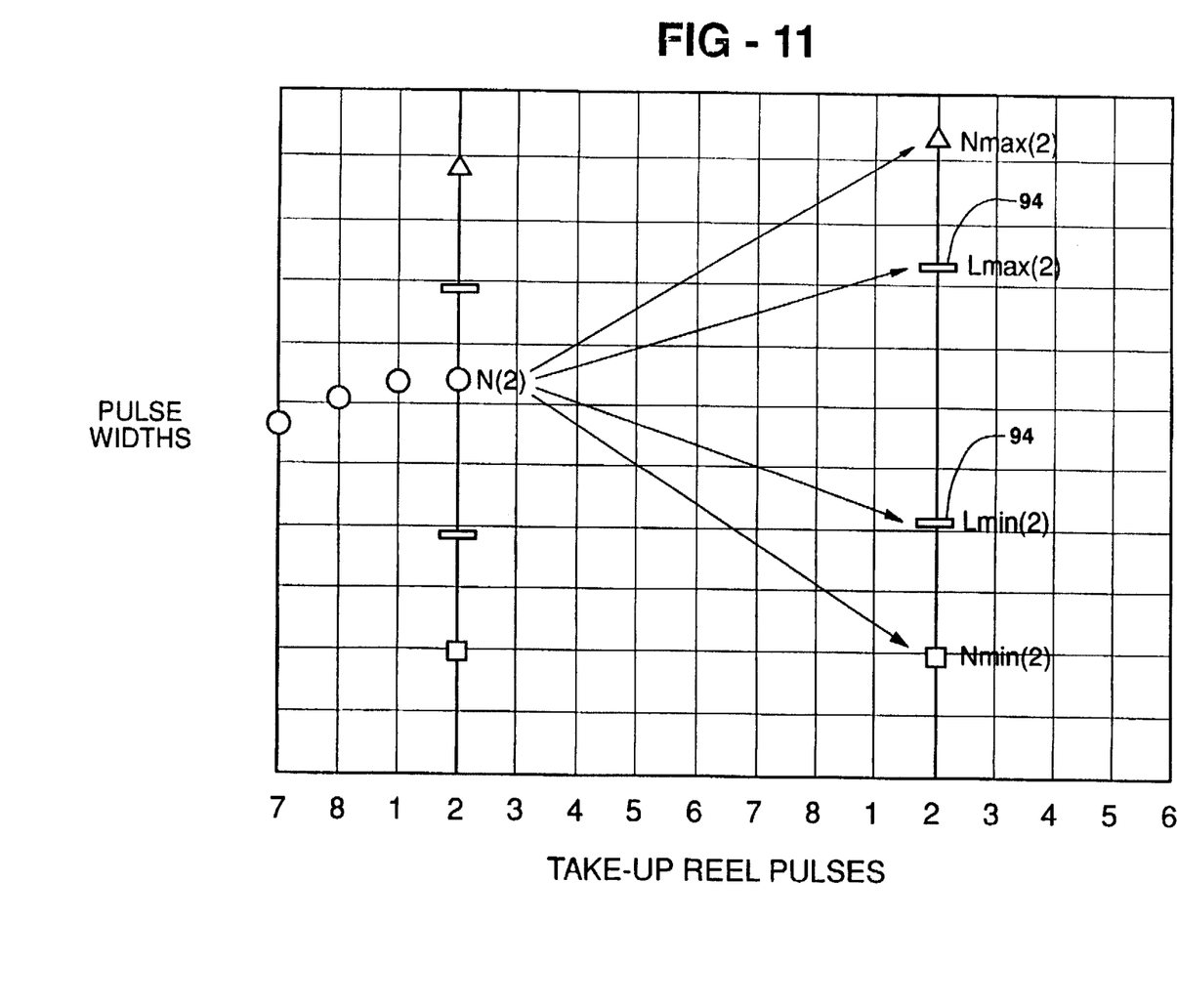
FIG. 11 is a graphic representation of the varying limits based on the preceding pulse width.

Referring to FIG. 9, the calculated pulse widths 60 identified a take-up reel 28 with a non-concentric take-up spindle 30. The upper stopping limits 62 and the lower stopping limits vary based on the pulse width for the same position of the stopping limit of the subsequent rotation immediately proceeding the current rotation. This calculation is best seen in FIG. 11 where it is shown that a pulse in the second position of a subsequent rotation is used to calculate the upper and lower stopping and inhibiting limits of the subsequent rotation immediately following. Therefore, in order to determine how the current stopping and inhibiting limits are calculated, the pulse width for the same position in the subsequent rotation immediately proceeding must be known. Again, the tape 26 is stopped as soon as a pulse width exceeds the upper stopping limit, Nmax(i), at third position in the fifth rotation.

Figure 13:
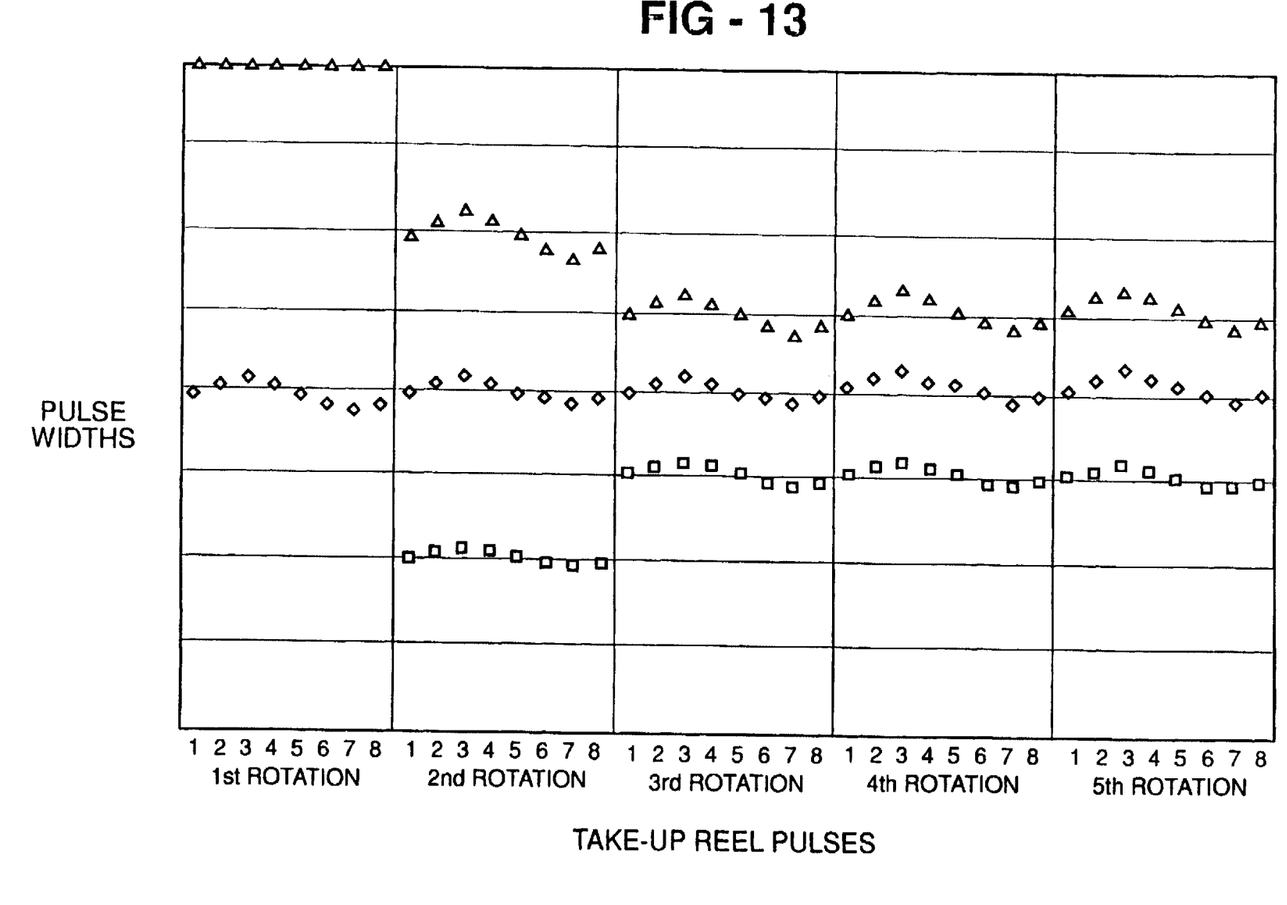
FIG. 13 is a graphic representation of the limits adaptively changing for a non-concentric take-up reel.

Referring to FIG. 13, the magnetic tape 26 continues to wrap around the take-up reel 28 even though the pulse widths calculated from the pulses of each rotation are not uniform. The adaptiveness of the present invention allows for the tape to continuing playing even though the take-up reel 28 has produced a non-uniform rotation with which to take-up the played tape. The varying stopping limits and inhibiting limits prevent the minor non-uniformities found in cassette tapes from disrupting the play back. As long as the pulse widths do not exceed the stopping limits, either the upper stopping limit or the lower stopping limit, the tape is allowed to continue playing.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for adaptively detecting when a portion of a magnetic tape is wrapped around a capstan of a magnetic tape cassette player, the method comprising the steps of:

transferring the magnetic tape from a supply reel to a take-up reel for a first rotation of the take-up reel;

passing the magnetic tape across the capstan when the magnetic tape is being transferred;

measuring a first set of pulses of a signal during the first rotation of the take-up reel;

measuring a subsequent set of pulses during each subsequent rotation of the take-up reel;

stopping the rotation of the take-up reel when the subsequent set of pulses varies from the subsequent set of pulses immediately proceeding to prevent the magnetic tape from wrapping around the capstan; and establishing stopping limits for each pulse in each of the subsequent sets based on each respective pulse from the subsequent set immediately proceeding wherein the step of stopping occurs when any of the pulses in the subsequent set exceed one of the stopping limits therefor.

2. A method as set forth in claim 1 including the step of establishing inhibiting limits for each pulse in each of the subsequent sets based on each respective pulse from the subsequent set immediately proceeding wherein the step of establishing stopping limits is inhibited when any of the pulses in the subsequent set exceeds one of the inhibiting limits therefor.

3. A method as set forth in claim 2 including the step of maintaining the stopping limits at a present value for the pulse in the subsequent set immediately following when the pulse exceeds one of the inhibiting limits.

4. A method as set forth in claim 3 wherein each of the pulses has an upper stopping limit and a lower stopping limit.

5. A method as set forth in claim 4 wherein each of the pulses in each of the subsequent sets has an upper and lower inhibiting limit.

6. A method as set forth in claim 5 including the step of modifying the upper and lower stopping limits and the upper and lower inhibiting limits when the pulse of the subsequent set immediately proceeding is less than the upper inhibiting limit and greater than the lower inhibiting limit.

* * * * *